US012206290B2

(12) United States Patent
Wisbar

(10) Patent No.: US 12,206,290 B2
(45) Date of Patent: Jan. 21, 2025

(54) LAMINATION RING FOR A LAMINATED ROTOR CORE OF A ROTOR OF AN ELECTRIC MACHINE, AND METHOD FOR PRODUCING A LAMINATED ROTOR CORE MADE OF MULTIPLE LAMINATION RINGS

(71) Applicant: Schaeffler Technologies AG & Co. KG, Herzogenaurach (DE)

(72) Inventor: Patrick Wisbar, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 303 days.

(21) Appl. No.: 17/638,230

(22) PCT Filed: Aug. 7, 2020

(86) PCT No.: PCT/DE2020/100696
§ 371 (c)(1),
(2) Date: Feb. 25, 2022

(87) PCT Pub. No.: WO2021/043362
PCT Pub. Date: Mar. 11, 2021

(65) Prior Publication Data
US 2022/0329121 A1    Oct. 13, 2022

(30) Foreign Application Priority Data

Sep. 2, 2019  (DE) ..................... 10 2019 123 434.4

(51) Int. Cl.
*H02K 1/30*   (2006.01)
*H02K 1/27*   (2022.01)
(Continued)

(52) U.S. Cl.
CPC ............... *H02K 1/30* (2013.01); *H02K 1/274* (2013.01); *H02K 15/03* (2013.01); *H02K 2213/03* (2013.01)

(58) Field of Classification Search
CPC .......... H02K 1/30; H02K 1/274; H02K 15/03; H02K 2213/03; H02K 1/2766
See application file for complete search history.

(56) References Cited

U.S. PATENT DOCUMENTS

| 2009/0134739 A1 | 5/2009 | Akita |
| 2013/0162099 A1 | 6/2013 | Yamaguchi et al. |
| 2018/0254676 A1* | 9/2018 | Nigo ...................... H02K 21/16 |

FOREIGN PATENT DOCUMENTS

| CN | 102570735 A | 7/2012 |
| CN | 106849398 A | 6/2017 |

(Continued)

*Primary Examiner* — Thomas Truong
(74) *Attorney, Agent, or Firm* — Volpe Koenig

(57) ABSTRACT

A lamination ring for constructing a laminated rotor core for a rotor of an electric machine and a method for producing a laminated rotor core made of multiple lamination rings for a rotor is disclosed. The lamination ring has multiple receiving openings for permanent magnets, and multiple structural elements are arranged homogeneously in the lamination ring at the same distance to one another in the circumferential direction in a rotated manner by an offset angle relative to the axis of symmetry such that the arrangement of structural elements is not symmetrical relative to the axis of symmetry of the lamination ring.

13 Claims, 6 Drawing Sheets

(51) Int. Cl.
*H02K 1/274*     (2022.01)
*H02K 15/03*     (2006.01)

(56)     References Cited

FOREIGN PATENT DOCUMENTS

| | | | |
|---|---|---|---|
| DE | 69204322 T2 | 4/1996 | |
| DE | 102009052596 A1 | 5/2011 | |
| DE | 102010005490 A1 | 7/2011 | |
| DE | 102011018619 A1 | 11/2011 | |
| DE | 102011115159 A1 | 3/2013 | |
| DE | 102012019182 A1 * | 3/2013 | |
| DE | 102012006169 A1 * | 10/2013 | ........... H02K 1/2766 |
| DE | 102014118581 A1 | 6/2016 | |
| DE | 102016212022 A1 * | 1/2018 | ............... H02K 1/27 |
| DE | 102017201438 A1 | 8/2018 | |
| EP | 2466732 B1 | 7/2016 | |
| EP | 3410571 A1 * | 12/2018 | ............. H02K 1/276 |
| IN | 105827036 A | 8/2016 | |
| JP | 2005210790 A | 8/2005 | |
| WO | 2013107127 A1 | 7/2013 | |

* cited by examiner

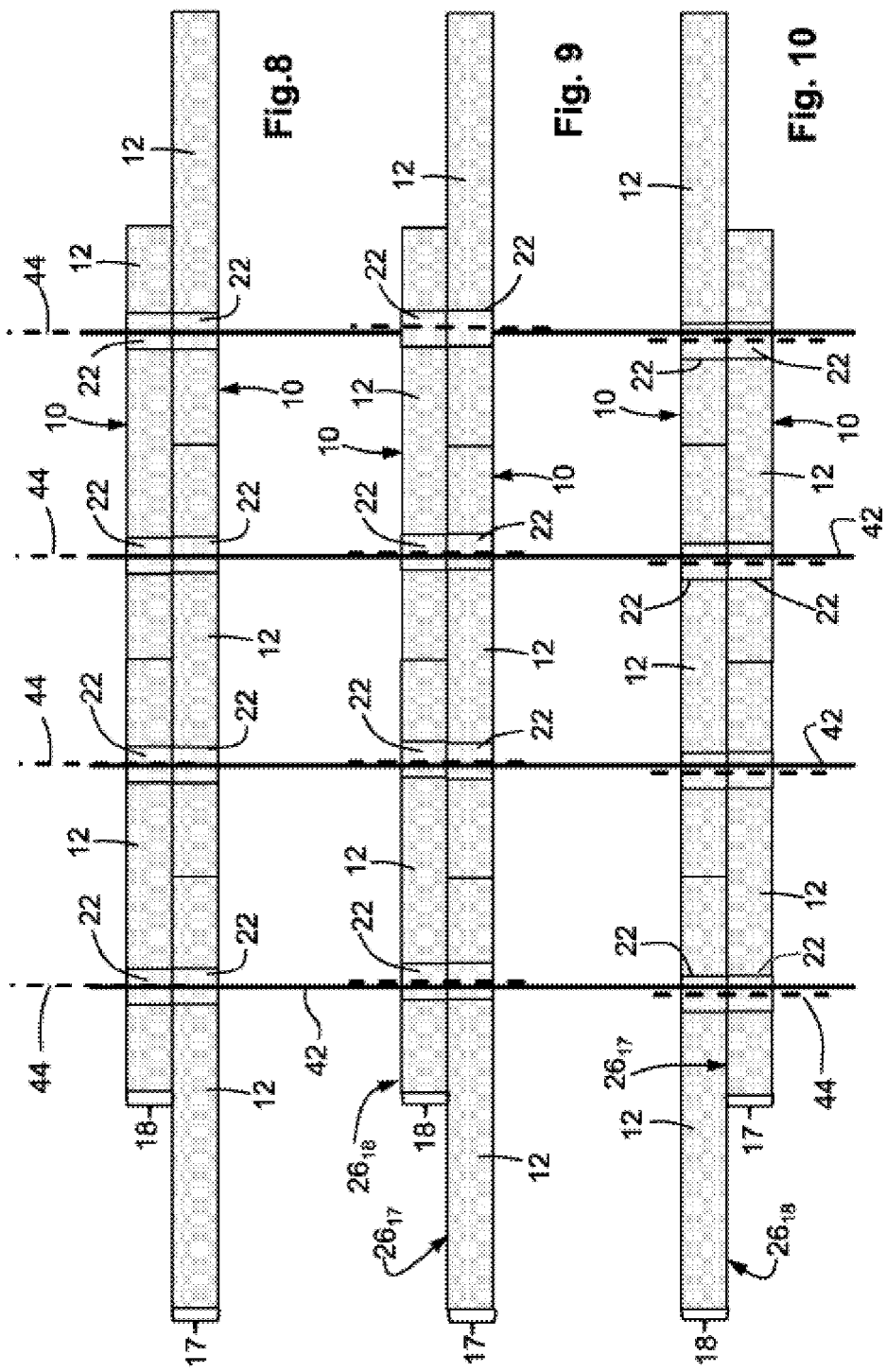

LAMINATION RING FOR A LAMINATED ROTOR CORE OF A ROTOR OF AN ELECTRIC MACHINE, AND METHOD FOR PRODUCING A LAMINATED ROTOR CORE MADE OF MULTIPLE LAMINATION RINGS

CROSS-REFERENCE TO RELATED APPLICATIONS

This application is the U.S. National Phase of PCT Appln. No. PCT/DE2020/100696 filed Aug. 7, 2020, which claims priority to DE 10 2019 123 434.4 filed Sep. 2, 2019, the entire disclosures of which are incorporated by reference herein.

TECHNICAL FIELD

The disclosure relates to a lamination ring for a laminated rotor core of a rotor of an electric machine. The laminated rotor core is made up of a plurality of stacked lamination rings.

The disclosure also relates to a method for producing a laminated rotor core made of multiple lamination rings for a rotor of a permanently excited electric machine.

BACKGROUND

The published German patent application DE 10 2009 052 596 A1 discloses a rotor of an electric machine, which is formed from individual segments. Each individual segment has a first part which, in the assembled state, is connected to a second corresponding part of the adjacent individual segment in a form-fitting manner, so that a self-supporting ring structure of the assembled rotor is formed in the circumferential direction. Each individual segment has an opening for a permanent magnet.

The published German patent application DE 10 2010 005 490 A1 discloses a rotor of an electric machine, which has individual segments and a rotor carrier. The individual segments are connected to the rotor carrier in a form-fitting manner.

The published German patent application DE 10 2011 018 619 A1 relates to a laminated core arrangement for a rotor of an electric machine, in particular a permanent magnet-excited synchronous machine of a vehicle, with a plurality of laminated core layers stacked on top of one another. Each laminated core layer consists of at least two laminated core parts in the shape of an annular segment, which are connected to one another in the circumferential direction via one end face each by means of a connecting arrangement. The individual laminated core layers of the laminated core arrangement can be connected by riveting or screwing.

The published German patent application DE 10 2011 115 159 A1 discloses a ring element for an electric motor. The first ring segment and at least one second ring segment are connected to one another to hold at least one magnet of the electric machine. The ring segments are connected to one another by means of the magnet. Furthermore, connecting elements interacting in a form-fitting manner can be formed at the joints of the adjacent ring segments.

The published German patent application DE 10 2012 019 182 A1 relates to a connection arrangement of at least one first ring segment on at least one second ring segment of a ring element for an electric machine. In the axial direction, the ring segments are mutually fixed by means of at least one plastic deformation of the ring segments of the ring element.

European patent EP 2 466 732 B1 discloses a manufacturing method for a laminated rotor body. The band-shaped core laminations have a plurality of pole sections which protrude radially outward. The band-shaped core laminations are laid one atop the other in such a way that the pole sections are aligned with one another.

The published German patent application DE 10 2017 2014 38 discloses a laminated core disc for the rotor of an electric machine. The laminated core disc comprises a plurality of laminated core disc segments, wherein each laminated core disc segment has a connecting element at a first distal end and a mating connecting element at a second distal end opposite the first distal end for form-fitting connection with the connecting element of a further laminated disc segment to produce the laminated core disc. A magnet receiving recess for forming a magnet receiving pocket for receiving a magnet is formed on the end faces of the two distal ends of each laminated core disc segment.

SUMMARY

The object of the disclosure is to create a lamination ring for constructing a laminated rotor core for a rotor of an electric machine, using which possible vibrations and noise generation in the rotor of the electric machine can be reduced or avoided and a smoother run is made possible.

This object is achieved by a lamination ring for a laminated rotor core of a rotor of an electric machine, which ring comprises the features described herein.

A further object of the disclosure is to create a method for producing a laminated rotor core made of multiple lamination rings for a rotor of a permanently excited electric machine, so that possible vibrations and noise generation in the electric machine can be reduced or avoided and a smoother run is made possible.

This object is achieved by a method for producing a laminated rotor core for a rotor of a permanently excited electric machine, which comprises the features described herein.

A possible embodiment of a lamination ring for constructing a laminated rotor core for a rotor of an electric machine, wherein the rotor is made up of a large number of stacked lamination rings, is characterized in that multiple receiving openings for permanent magnets are formed in pairs and in a V-shape relative to one another in the circumferential direction in the lamination ring. Furthermore, the receiving openings for the permanent magnets are designed symmetrically relative to an axis of symmetry of the lamination ring. In addition, several structural elements are designed to be homogeneous and at the same distance from one another in the circumferential direction in the lamination ring, rotated by an angle relative to the axis of symmetry of the lamination ring. The arrangement of the structural elements is thus not symmetrical to the axis of symmetry of the lamination ring.

The advantage of the above-described configuration of the lamination ring is that, through the assembly of the lamination ring or a group of lamination rings to form a laminated rotor core, the structural elements of the first two lamination rings or groups of lamination rings form an offset. The upper lamination ring or the group of lamination rings is rotated 180° about the axis of symmetry and is/are installed to form the laminated rotor core. A group of lamination rings is defined in that two or more of the individual lamination rings are stacked in the same orientation in the axial direction. The passages (bores) for the fixing means are aligned within a group in the axial direction.

According to a possible embodiment of the disclosure, the lamination ring can consist of multiple and identical annular segments. Each of the identical and annular segments has multiple of the receiving openings arranged in pairs and in a V-shape relative to one another. At least two structural elements are formed in such a way that each of the structural elements is displaced in the circumferential direction by an angle relative to an axis of symmetry of the receiving openings for the permanent magnets.

The advantage of forming the lamination rings from the multiple identical and annular segments is that fixing means can be passed through structural elements of the laminated rotor core in order to fasten the laminated rotor core to a retaining ring (or the like). Fixing means such as screws or rivets are preferred. Due to the annular segments that form the lamination ring, a significantly higher utilization of the punched metal sheet can be achieved. All segments can be produced with the geometrically identical punched part. Each of the segments can be installed in any position in the laminated rotor core. This keeps handling and logistics simple.

Each of the annular segments using which the lamination rings can be produced has a first end face with a connection system and a second end face with a complementary connection system in the circumferential direction.

According to an advantageous embodiment, a first connecting element, a second connecting element and a third connecting element are formed on the first connection system, which differ in their shapes. A first complementary connecting element, a second complementary connecting element and a third complementary connecting element are formed on the second connection system, which differ in their shapes. To connect the individual segments to a closed annular ring, the first connecting element interacts with the first complementary connecting element of a subsequent annular segment, the second connecting element interacts with the second complementary connecting element of the subsequent annular segment and the third connecting element with the third complementary connecting element of the subsequent annular segment in a form-fitting manner.

According to an advantageous embodiment, two structural elements are formed on each of the annular segments.

According to one embodiment of the disclosure, the structural elements are designed as passages for receiving one fixing means in each case. The fixing means are used to assemble the laminated rotor core on a holding disc.

According to a possible further embodiment of the disclosure, the structural elements have a form-fit geometry in order to hold the lamination rings against one another or to fasten the first lamination ring of the laminated rotor core to a holding disc. The structural elements serve to connect the lamination ring or the groups of lamination rings to the rotor carrier. For example, the structural elements can be designed as a toothing of the inner diameter, as a form-fit geometry or the like.

In the possible embodiment in which the structural elements are designed as passages or bores, the passages of the stacked lamination rings or the stacked groups of lamination rings are arranged with the predefined offset angle. Despite the offset angle, it is still possible for a fixing means to run in each of the passages of the laminated rotor core. The fixing means (screw connection or rivet connection) fix the spatial position of the laminated rotor core in the rotor.

According to one of the preferred embodiments of the disclosure, the lamination rings are made from a plurality of identical annular segments. By using a fixation by means of screws or rivets, full rings (continuous lamination rings) can be dispensed with. The segmentation of the laminated rotor core (rotor stack) in combination with the screwing or riveting mentioned above provides the greatest advantage. The screws or rivets are evenly distributed radially in the annular segment. Furthermore, the annular segments promise a significantly higher utilization of the metal sheet from which the individual segments are punched. Since all segments consist of the geometrically identical punched part, the segment can be installed as desired and in any position in the rotor, which keeps handling and logistics simple. By preferably using the geometrically identical segments, the manufacturing costs can be kept to a minimum.

An offset angle is understood to mean the rotation of the installation position of an individual lamination ring or a stack of identical lamination rings which are rotated about an axis of symmetry relative to the other lamination ring or the other stack of identical lamination rings. The offset angle has positive effects in regard to possible vibrations and noise generation and enables the electric machine to run more smoothly.

A simple approach is to move the regular passages (bores) for screws/rivets on their hole circle of the lamination ring or the annular segment by half the amount of the offset. The second (subsequent) lamination ring or the second (subsequent) group of lamination rings is installed in the opposite position so that the angular displacements add up.

According to a possible embodiment, this angular displacement in the lamination rings or the annular segments can be 0.4°. The first lamination ring or the first group of lamination rings rests in a defined position with the underside for screwing on the screwing surface.

The second (subsequent) lamination ring or the second group of lamination rings is then positioned on the upper side of the first (bottom) lamination ring or the first group of lamination rings in such a way that both upper sides lie atop one another and the structural elements (passages, bores) are aligned with one another. With this method, the bores are displaced 0.4° to the right in relation to an averaged position of the bores, whereas the bores of the second lamination ring or the second group of lamination rings are displaced 0.4° to the left. This results in an offset of 0.8°.

According to a possible embodiment of the disclosure, the lamination rings consisting of the annular segments are stacked individually or in groups in such a way that the joints of the lamination rings are aligned in the direction of an axis of the laminated rotor core.

According to a possible further embodiment of the disclosure, the lamination rings consisting of the annular segments are stacked in such a way that the joints of all lamination rings are offset from one another by half an angular amount of the annular segment.

According to yet another embodiment of the disclosure, the lamination rings consisting of the annular segments are stacked in groups. In each group, the lamination rings consisting of the annular segments are arranged in such a way that the joints between the lamination rings are aligned in the direction of an axis of the laminated rotor core. The groups are arranged in the laminated core stack in such a way that the joints in the direction of the axis of successive groups are offset from one another by half an angular amount of the annular segment.

When stacking the lamination rings from the individual, annular segments, there are various possible concepts, as described above, for example (end-to-end, or alternately segmented). The connection of the individual segments to the lamination ring can, for example, be performed in a form-fitting manner. The position of the individual segment levels can be changed after each individual laminated core layer in order to distribute the joints in the best possible way, which entails a high level of handling effort. An alternative embodiment would be to stack a certain number of segmented lamination rings in a group. The resulting group of segmented lamination rings (multiple individual lamination rings) can be rotated relative to a subsequent group. The joints are not rotated within the individual lamination rings of the group, but form a good compromise between handling and minimizing losses.

According to the method according to the disclosure for producing a laminated rotor core made of multiple lamination rings for a rotor of a permanently excited electric machine, the following method steps can be provided:
a) Forming a plurality of identical lamination rings, wherein each lamination ring has multiple receiving openings for permanent magnets, which are distributed in pairs and in a V-shape to one another in the circumferential direction symmetrically to an axis of symmetry of the lamination ring, and wherein multiple structural elements are formed homogeneously in the lamination ring at the same distance to one another in the circumferential direction in a rotated manner by an offset angle relative to the axis of symmetry such that the arrangement of structural elements is not symmetrical relative to the axis of symmetry of the lamination ring;
b) Rotating a lamination ring or a group of lamination rings by 180° about the axis of symmetry;
c) Placing the rotated lamination ring or the rotated group of lamination rings as a subsequent lamination ring or subsequent group of lamination rings on the previous, non-rotated lamination ring or a previous, non-rotated group of lamination rings;
d) Placing a non-rotated lamination ring or a non-rotated group of lamination rings on the previous lamination ring;
e) Carrying out steps b to d until the laminated rotor core is finished and the laminated rotor core is fixed to a holding disc with one fixing means for each structural element.

According to a preferred embodiment of the method according to the disclosure, the individual lamination rings or groups of lamination rings are stacked in such a way that the structural elements of the lamination rings or the groups of lamination rings of two successive lamination rings or groups of lamination rings are offset from one another by an offset angle in the circumferential direction.

According to a preferred embodiment, the lamination rings can be constructed from multiple annular and identical segments which are punched out of a metal sheet. Each of the annular segments then has a connection system in the circumferential direction on a first end face and a complementary connection system on a second end face. Furthermore, each of the annular segments then has multiple receiving openings for permanent magnets arranged in pairs and in a V-shape relative to one another and at least two structural elements. The at least two structural elements are formed in such a way that each structural element is displaced in the circumferential direction by half an offset angle relative to an axis of symmetry of the receiving openings for permanent magnets.

A lamination ring can be formed from a defined number of the multiple annular and identical segments in that the connection system of the first end face of an annular segment interacts in a form-fitting manner with the complementary connection system on the second end face of the subsequent annular segment. The multiple annular and identical segments for the lamination ring can be connected, for example, by clinching the segments The advantage of the method according to the disclosure is that a completely cylindrical rotor carrier is not necessary when fixing (screwing or riveting) the laminated rotor core. It is sufficient if only one centering seat is formed for the laminated rotor core. The centering can also performed completely during the assembly of the laminated rotor core using a suitable tool.

Another embodiment can be to completely omit the rotor carrier as a tubular carrier element and to fasten the laminated rotor core to a holding disc. Other parts of a hybrid module can also be attached to it. The holding disc could also be used as a pressure plate for the clutch. This increases the proportion of functional integration and the radial installation space that is opened up could be used to increase the torque of the electric motor.

BRIEF DESCRIPTION OF THE DRAWINGS

With reference to the accompanying drawings, the disclosure and its advantages will now be explained in more detail by means of exemplary embodiments, without thereby limiting the disclosure to the exemplary embodiment shown. The proportions in the figures do not always correspond to the real proportions, since some shapes are simplified and other shapes are shown enlarged in relation to other elements for better illustration.

FIG. 8 shows a schematic view of two layers of stacked lamination rings or groups of lamination rings without a displacement of the structural elements (passages).

FIG. 9 shows a schematic view of two layers of stacked lamination rings or groups of lamination rings with a displacement of the structural elements (passages) to the right by half the offset angle.

FIG. 10 shows a schematic view of two layers of stacked lamination rings or groups of lamination rings with a displacement of the structural elements (passages) by the entire offset angle.

DETAILED DESCRIPTION

Figure 1:
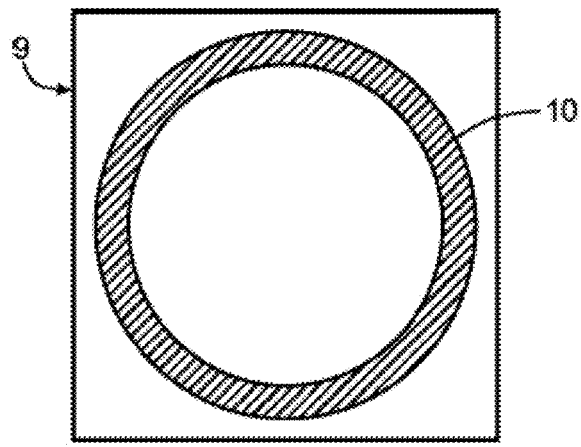
FIG. 1 shows a plan view of a metal sheet from which a lamination ring is punched out according to the background of the art for a laminated rotor core.

Identical reference symbols are used for elements of the disclosure that are the same or have the same effect. Furthermore, for the sake of clarity, only reference numerals are shown in the individual figures that are necessary for the description of the respective figure. The figures merely represent exemplary embodiments of the disclosure without, however, restricting the disclosure to the exemplary embodiments shown.

FIG. 1 shows a plan view of a metal sheet 9, from which a lamination ring 10 according to the background of the art is punched for the removal of a laminated rotor core 1. Due to the assembly conditions, such as, for example, cross-interference, screwing, riveting and the like, the lamination rings 10 of the laminated rotor core 1 are designed as full rings. However, this means extremely high punching waste in the production of these full rings (individual cores).

Figure 2:
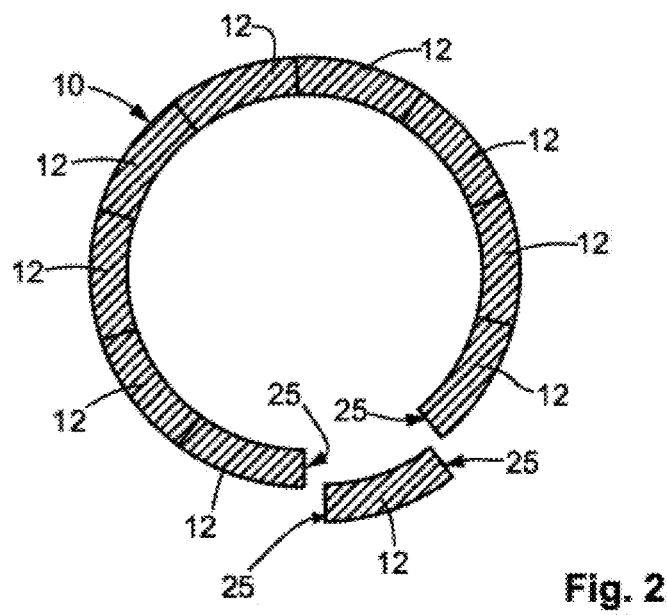
FIG. 2 shows a schematic plan view of a lamination ring which is formed from a plurality of annular segments.
Figure 3:
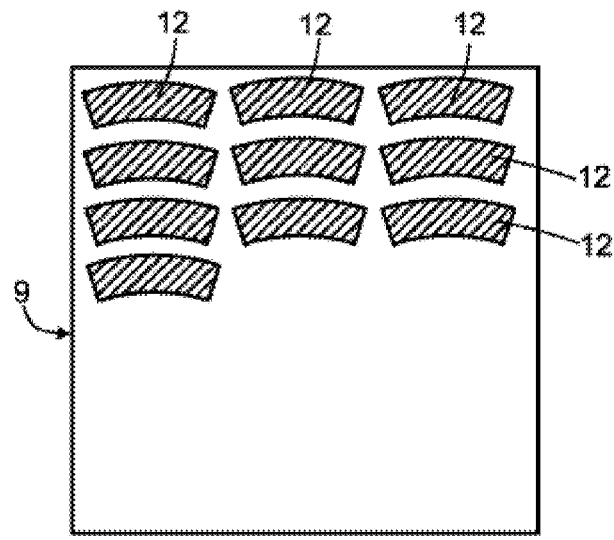
FIG. 3 shows a schematic plan view of a metal sheet; from which, according to the disclosure, the annular segments for the lamination ring of FIG. 3 are punched out.

FIG. 2 shows a schematic plan view of a lamination ring 10 which is formed from a plurality of annular ring segments 12. FIG. 3 shows a schematic plan view of a metal sheet 9, from which, according to the disclosure, the annular ring segments 12 for the lamination ring 10 of FIG. 3 are punched out. All of the punched out annular ring segments 12 are identical. The lamination ring 10 is created from the annular ring segments 12. The arrangement of the annular ring segments 12 enables a significantly higher utilization of the metal sheet 9. It is possible, for example, to use a punching tool (not shown) with multiple nests, or to move the metal sheet 9 under the punching tool. All annular ring segments 12 are designed to be geometrically identical.

Figure 4:
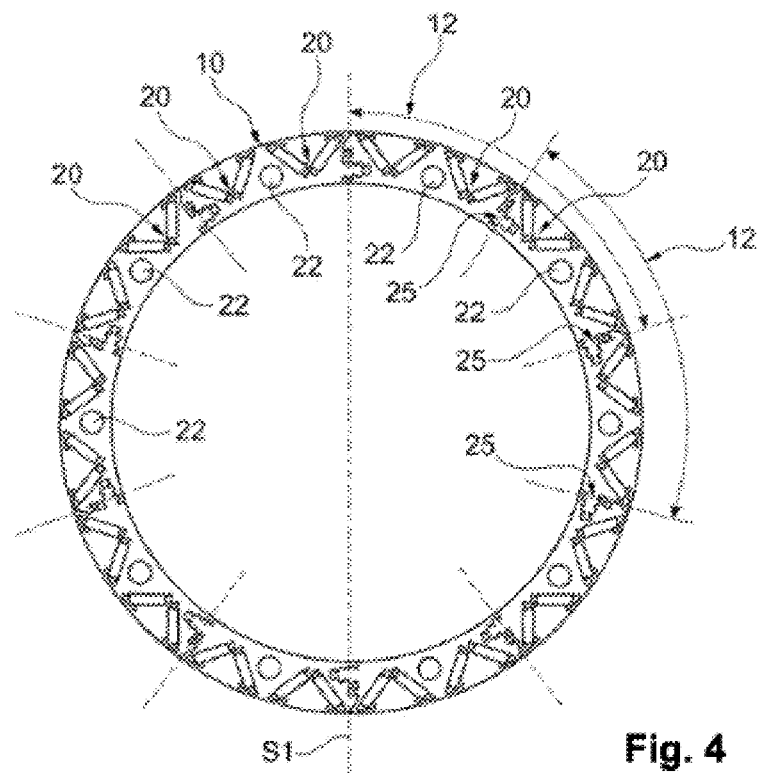
FIG. 4 shows a plan view of a lamination ring which is formed from multiple annular segments according to the disclosure.

FIG. 4 shows a plan view of two lamination rings 10 arranged one above the other, both of which are formed from multiple annular segments 12 according to a possible embodiment of the disclosure. The plan view shows two segment levels. The annular ring segments 12 of the upper lamination ring 10 are identified by the dashed lines. The annular segments 12 of the lower lamination ring 10 are identified by the dashed-dotted lines. The structural elements 22 for the fixing means (not shown here) and the receiving openings 20 arranged in pairs for the permanent magnets are distributed in a rotationally symmetrical manner on each of the lamination rings 10. In the embodiment of the annular segments 12 shown here, the structural elements 22 are designed as passages or bores, which is not to be understood as a limitation of the disclosure. In the embodiment shown here, each of the lamination rings 10 consists of five annular segments 12. The upper lamination ring 10 is rotated by half an angular range (arc length B) of the annular segment 12 relative to the lower lamination ring 10.

From FIG. 4 it can be clearly seen that, despite the rotation, the structural elements 22 of the stacked two lamination rings 10 consisting of the annular segments 12 are in alignment. The receiving openings 20 for permanent magnets (not shown here), which are arranged in pairs, are also aligned. By rotating the upper lamination ring 10 relative to the lower lamination ring 10, the joints 25 between the annular segments 12 of the upper lamination ring 10 and the annular segments 12 of the lower lamination ring 10 are correspondingly rotated. The lamination ring 10 is axially symmetrical relative to the axis of symmetry S1.

Figure 5:
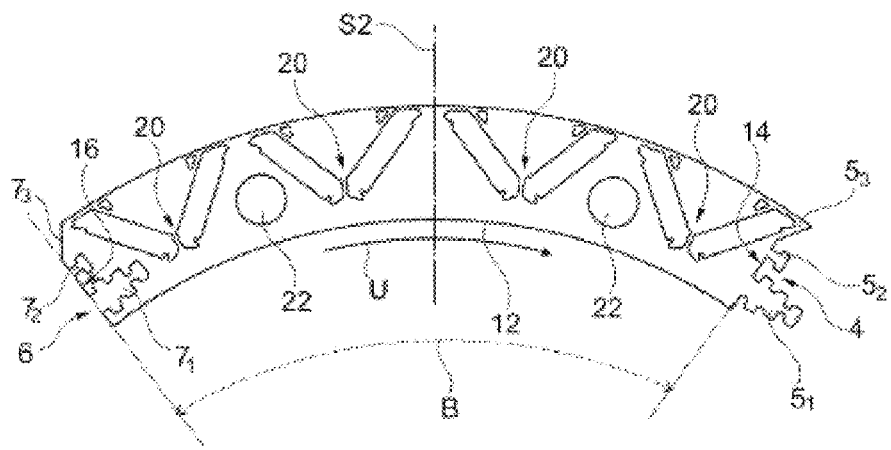
FIG. 5 shows a plan view of an annular segment according to the disclosure.

FIG. 5 shows a plan view of a possible embodiment of an annular segment 12 according to the disclosure. Each annular segment 12 has a first end face 14 with a connection system 4 in the circumferential direction U. The annular segment 12 also has a second end face 16. The first end face 14 has a connection system 4 that is formed during the punching process. The second end face 16 has a connection system 6 which is complementary to the connection system 4 and which is also formed during the punching process.

In the embodiment shown here, which should not be understood as a limitation of the disclosure, the first connection system 4 consists of a first connecting element $5_1$, a second connecting element $5_2$ and a third connecting element $5_3$, which differ in their shape. The second connection system 6 consists of a first complementary connecting element $7_1$, a second complementary connecting element $7_2$ and a third complementary connecting element $7_3$, which also differ in their shape. The first connecting element $5_1$ interacts with the first complementary connecting element $7_1$ of a subsequent annular segment 12 in a form-fitting manner. The second connecting element $5_2$ interacts with the second complementary connecting element $7_2$ of the subsequent annular segment 12 in a form-fitting manner. The third connecting element $5_3$ interacts with the third complementary connecting element $7_3$ of the subsequent annular segment 12 in a form-fitting manner.

Each of the annular segments 12 has the punched-out receiving openings 20 for the permanent magnets, which are all arranged axially symmetrically to an axis of symmetry S2 of the annular segment 12. Due to the displacement by the offset angle 40 (see FIG. 7), the multiple structural elements 22 are not arranged axially symmetrically about the axis of symmetry S2 of the annular segment 12. Furthermore, the receiving openings 20 for permanent magnets and the multiple structural elements 22 are arranged homogeneously along an arc length B of the annular segment 12.

Figure 6:
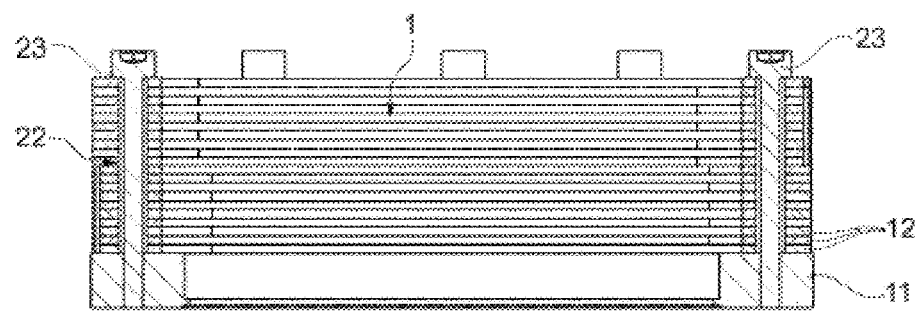
FIG. 6 shows a sectional view of a mounted laminated rotor core.

FIG. 6 shows a sectional view of an assembled laminated rotor core 1. In the embodiment shown here, the rotor carrier, as a tubular carrier element, can be completely omitted and the laminated rotor core 1 is fastened to the holding disc 11. The fixing means 23 are designed as screws. The screws run in the structural elements 22 of the stacked lamination rings 10 or the stacked groups of lamination rings 10 and interact with the holding disc 11 to fixate the laminated rotor core 1.

Figure 7:
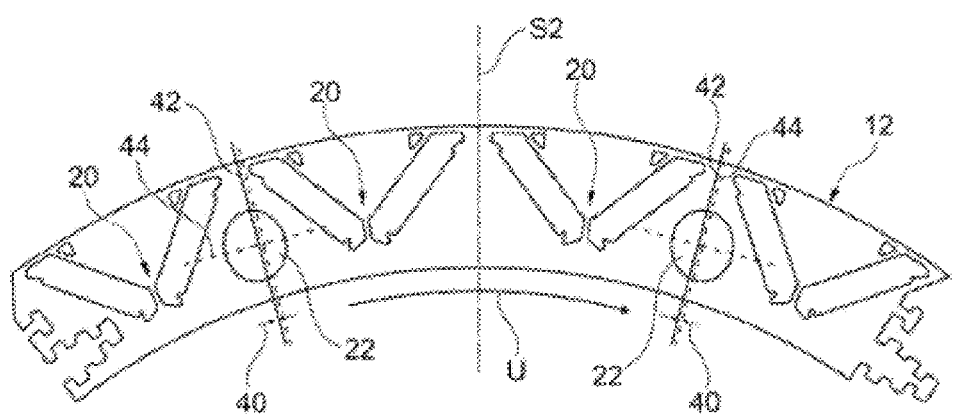
FIG. 7 shows, in a plan view of one of the annular segments, the formation of the passages (bores) in order to form the offset angle.

FIG. 7 shows a plan view of one of the annular segments 12, in which the formation of the structural elements 22 (such as, for example, passages or bores) is offset by an offset angle 40. The solid line 42 marks the center between the receiving openings 20 for the permanent magnets. The dashed cross 44 marks the center of the structural element 22. In the embodiment shown here, the annular segment 12 has two structural elements 22 which are arranged homogeneously and at the same distance to one another in the circumferential direction U. The structural elements 22 are arranged at an angle 40 relative to the center line 42 of the receiving openings 20 for the permanent magnets. The rotation of the structural elements 22 of the annular segment 12 by the angle 40 is clear from the deviation of the cross 44 marking the center of the structural element 22 and the center line 42 of the receiving openings 20 for the permanent magnets. The angle 40 of the rotation is defined as half the offset angle.

FIG. 8 shows a schematic view of a first, lowermost layer 17 and a second, uppermost layer 18 of stacked lamination rings 10 or groups of lamination rings 10 consisting of annular segments 12. Here there is no displacement of the structural elements 22 of the annular segments 12 (passages) relative to the center line (represented here by the solid line 42) of the receiving openings 20 (not shown here) for permanent magnets. The angle 40 is equal to zero and the solid line 42 coincides with the dashed line 44 which marks the center of the structural element 22.

FIG. 9 shows a schematic view of two layers 17 and 18 of stacked lamination rings 10 or groups of lamination rings 10 with the structural elements 22 (passages) displaced to the right by half an angle 40. The displacement of the structural elements 22 of the annular segments 12 (passages) relative to the center line (represented here by the solid line 42) of the receiving openings 20 for permanent magnets is illustrated by the fact that the solid line 42 does not match the dashed line 44, which marks the center of the structural element 22.

FIG. 10 shows a schematic view of two layers 17 and 18 of stacked lamination rings 10 or groups of lamination rings 10 with a displacement of the structural elements 22 (passages) by the angle 40 (offset angle). The displacement or rotation by the angle 40 is achieved by placing the top lamination ring 10 (top layer 18) or the top group (top layer 18) of lamination rings 10 with an upper side $26_{18}$ on the top side $26_{17}$ of the lower lamination ring 10 (lowermost layer 17) or the lower group (lowermost layer 17) of lamination rings 10. This is achieved in that the top lamination ring 10 (top layer 18) or the top group (top layer 18) of lamination rings 10 is rotated by 180° around the axis of symmetry S1 (see FIG. 4).

Figure 11:
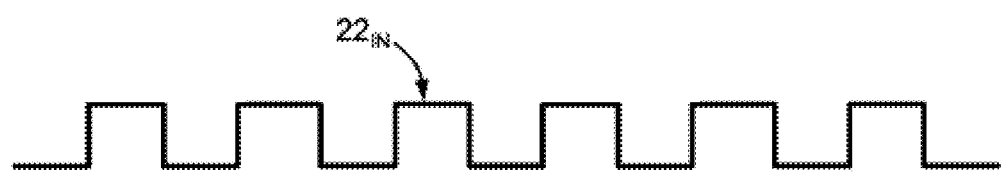
FIG. 11 shows a schematic side view without a displacement of the structural elements (internal toothing).

FIG. 11 shows a schematic side view, wherein there was no displacement of the structural elements 22 of the lamination ring 10 (not shown) or the annular segments 12 (not shown) of the lamination ring 10, which are formed as internal teeth $22_{IN}$. Consequently, the angle 40 is zero.

Figure 12:
FIG. 12 shows a schematic side view of the displacement of the structural elements (internal toothing) to the right by half the offset angle.

FIG. 12 shows a schematic side view of the displacement of the structural elements (internal toothing) $22_{INV}$ to the right by half the angle 40 (offset angle). The angle 40 results from the comparison of the non-displaced internal toothing $22_{IN}$ and the displaced internal toothing $22_{INV}$. The displacement occurs in a manner analogous to that already explained in the description of FIG. 9.

Figure 13:
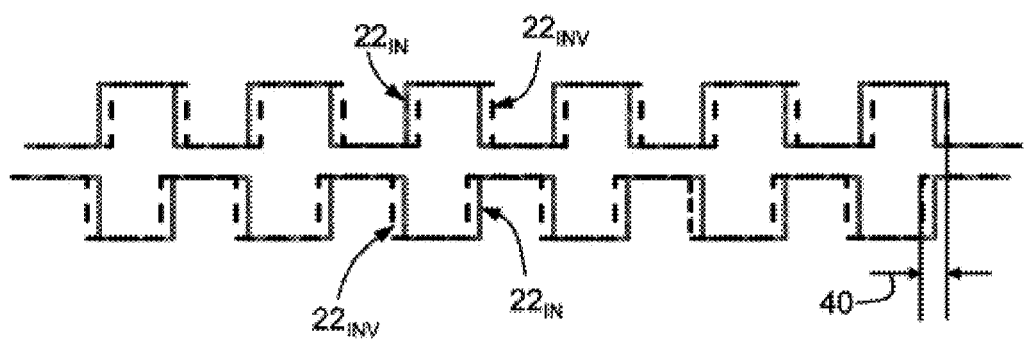
FIG. 13 shows a schematic side view of the displacement of the structural elements (internal toothing) by the offset angle, wherein the top lamination ring or the top group of lamination rings are rotated by 180°.

FIG. 13 shows a schematic side view of the displacement of the structural elements (internal toothing) $22_{INV}$ by the angle 40 (full offset angle). Analogously to the description of FIG. 10, the uppermost lamination ring 10 or the uppermost group of lamination rings 10 was rotated by 180°. The result is the angle 40 (full offset angle), which results from the comparison of the non-displaced internal toothing $22_{IN}$ and the displaced internal toothing $22_{INV}$ of the two lamination rings 10 or the two groups of lamination rings 10.

It is believed that the present disclosure and many of the advantages noted therein will be understandable from the preceding description. Obviously, various changes in the shape, construction and arrangement of the components can be made without departing from the disclosed subject matter. The form described is illustrative only and it is the intent of the appended claims to embrace and incorporate such changes. Accordingly, the scope of the disclosure should be limited only by the appended claims.

LIST OF REFERENCE SYMBOLS

1 Laminated rotor core
4 Connection system
$5_1$ First connecting element
$5_2$ Second connecting element
$5_3$ Third connecting element
6 Complementary connection system
$7_1$ First complementary connecting element
$7_2$ Second complementary connecting element
$7_3$ Third complementary connecting element
9 Metal sheet
10 Lamination ring
11 Holding disc
12 Annular segment
14 First end face
16 Second end face
17 First or lowermost layer
18 Second or uppermost layer
20 Receiving openings for permanent magnets
22 Structural elements
$22_{IN}$ Internal toothing
$22_{INV}$ Displaced internal toothing
23 Fixing means
25 Joint
$26_{17}$ Top side
$26_{18}$ Top side
40 Offset angle; angle
42 Solid line
44 Dashed cross, dashed line
B Arc length
S1 Axis of symmetry of the lamination ring
S2 Axis of symmetry of the lamination ring
U Circumferential direction

The invention claimed is:

1. A lamination ring for constructing a laminated rotor core for a rotor of an electric machine, the lamination ring comprising:
   a plurality of identical annular segments which each comprise:
      a plurality of receiving openings for permanent magnets formed in four pairs and each pair in a V-shape to one another in a circumferential direction and distributed symmetrically to an axis of symmetry of the annular segment, such that a first set of pairs of receiving openings is symmetric with a second set of pairs of receiving openings about the axis of symmetry of the annular segment; and
      a plurality of structural elements formed homogeneously in the annular segments at a same distance to one another in the circumferential direction, rotated by an offset angle relative to the axis of symmetry such that an arrangement of the structural elements is not symmetrical relative to the axis of symmetry of the annular segment, and each of the structural elements is positioned between a set of pairs of receiving openings.

2. The lamination ring according to claim 1, wherein the plurality of structural elements comprises at least two structural elements formed in such a manner that each of the structural elements is displaced by an angle relative to a center line between the set of pairs of the receiving openings in the circumferential direction.

3. The lamination ring according to claim 1, wherein each of the annular segments for producing the lamination ring has a first end face with a connection system and a second end face with a complementary connection system in the circumferential direction.

4. The lamination ring according to claim 1, wherein two structural elements are formed on each of the annular segments.

5. The lamination ring according to claim 1, wherein the structural elements are designed as passages for receiving a respective fixing element for mounting the laminated rotor core on a holding disc.

6. The lamination ring according to claim 1, wherein the structural elements have a form-fit geometry to hold multiple lamination rings against one another or to secure the lamination ring of the laminated rotor core to a holding disc, respectively.

7. The lamination ring according to claim 1, wherein the structural elements are formed such that each structural element is displaced by half the offset angle relative to the axis of symmetry in the circumferential direction.

8. The lamination ring according to claim 1, wherein a center line is defined between each set of pairs of the receiving openings, and a center of the structural element positioned between the first or second set of pairs of the receiving openings is offset from the center line.

9. A method for producing a laminated rotor core made of multiple lamination rings for a rotor of a permanently excited electric machine, comprising the following steps:
   a) forming a plurality of identical lamination rings, wherein each lamination ring comprises:
      a plurality of identical annular segments which each comprise:
         a plurality of receiving openings for permanent magnets formed in four pairs and each pair in a V-shape to one another in a circumferential direction and distributed symmetrically to an axis of symmetry of the annular segment, such that a first set of pairs of receiving openings is symmetric with a second set of pairs of receiving openings about the axis of symmetry of the annular segment, and
         a plurality of structural elements formed homogeneously in the annular segments at a same distance to one another in the circumferential direction, rotated by an offset angle relative to the axis of symmetry such that an arrangement of structural elements is not symmetrical relative to the axis of symmetry of the annular segments, and each of the structural elements is positioned between a set of pairs of receiving openings;
   b) rotating a lamination ring of the plurality of identical lamination rings by 180° about the axis of symmetry;
   c) placing the rotated lamination ring as a subsequent lamination ring on a previous, non-rotated lamination ring;
   d) placing a non-rotated lamination ring of the plurality of identical lamination rings on the previous lamination ring; and
   e) carrying out steps b to d until the laminated rotor core is finished and the laminated rotor core is fixed to a holding disc with one fixing element for each structural element.

10. The method according to claim 9, wherein the lamination rings are stacked in such a way that the structural elements of the lamination rings of two successive lamination rings are offset from one another by the offset angle in the circumferential direction.

11. The method according to claim 9, comprising punching out of a metal sheet the plurality of identical annular segments, so that in the circumferential direction on a first end face a connection system, and on a second end face a complementary connection system,
   wherein the plurality of structural elements comprises at least two structural elements formed on each of the annular segments; and
   wherein the at least two structural elements are formed such that each structural element is displaced by half an offset angle relative to an axis of symmetry of the receiving openings for permanent magnets in the circumferential direction.

12. The method according to claim 11, wherein each lamination ring is formed from a defined number of the plurality of identical annular segments in that the connection system of the first end face of an annular segment interacts in a form-fitting manner with the complementary connection system on the second end face of the subsequent annular segment.

13. The method according to claim 9, wherein a center line is defined between each set of pairs of the receiving openings, and a center of the structural element positioned between the first or second set of pairs of the receiving openings is offset from the center line.

* * * * *